United States Patent [19]

Walter et al.

[11] Patent Number: 4,494,121
[45] Date of Patent: Jan. 15, 1985

[54] DIRECTION FINDING ANTENNA

[75] Inventors: Carlton H. Walter; Peter Bohley, both of Columbus, Ohio; Robert P. Couture, Irvine, Calif.

[73] Assignee: Interstate Electronics Corporation, Calif.

[21] Appl. No.: 376,292

[22] Filed: May 10, 1982

[51] Int. Cl.³ .............................................. G09F 9/30
[52] U.S. Cl. .................................. 343/708; 343/792.5
[58] Field of Search ............... 343/705, 708, 711, 712, 343/713, 792.5, 700 MS

[56] References Cited

U.S. PATENT DOCUMENTS

| | | | |
|---|---|---|---|
| 3,110,030 | 11/1963 | Cole, Jr. | 343/792.5 |
| 3,286,268 | 11/1966 | Barbano | 343/792.5 |
| 4,257,049 | 3/1981 | Kuo | 343/792.5 |
| 4,392,139 | 7/1983 | Aoyama et al. | 343/705 |

Primary Examiner—Theodore M. Blum
Attorney, Agent, or Firm—Knobbe, Martens, Olson & Bear

[57] ABSTRACT

A direction finding antenna for use in missiles and the like may include arrays of log periodic monopole antennas. The antennas may be constructed of thin, metallic stub regions laminated to an insulative support backing as a part of a wing of a missile. The antennas are triangular in shape in order to provide improved performance and to conform to the shape of wings on the missile. The antennas perform an aerodynamic function as parts of the wings as well as performing an electromagnetic function in the direction finding system. The antennas are provided with parallel feed lines which extend along the base of the triangular antenna, connecting with antenna stubs on both sides of the support backing, and connecting together at the forward end of the antenna. The antenna stubs are generally rectangular metallic sheets arranged in order of increasing length on the support backing. Electrically longer antenna stubs may be provided with zig-zag convolutions for improved performance at lower radio frequencies.

17 Claims, 12 Drawing Figures

FIG. 2
FIG. 3
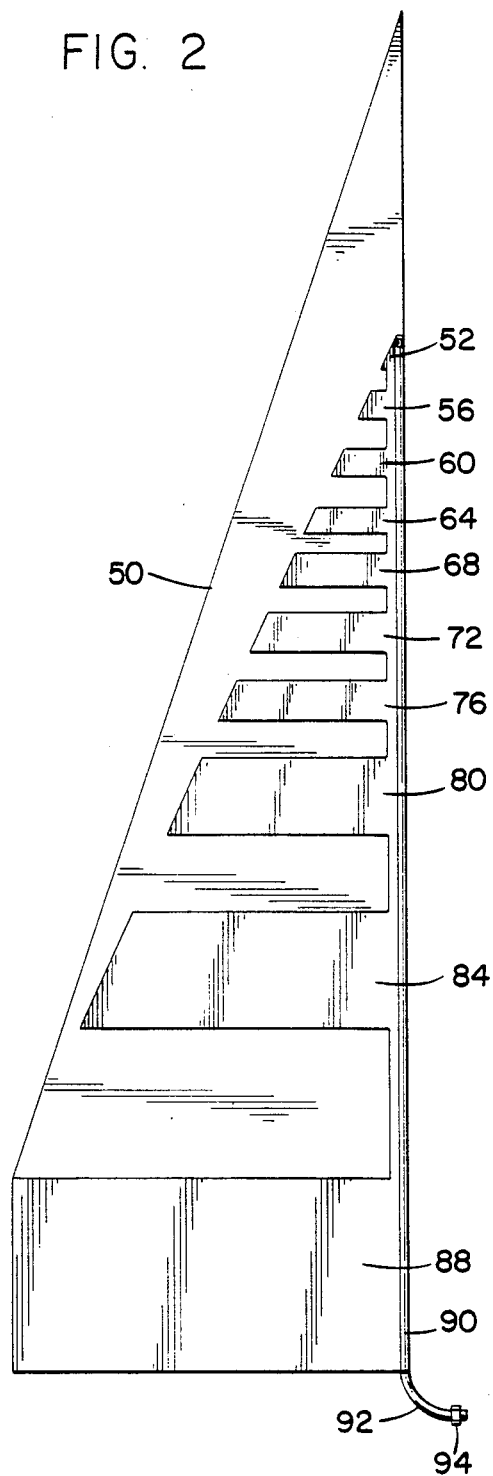
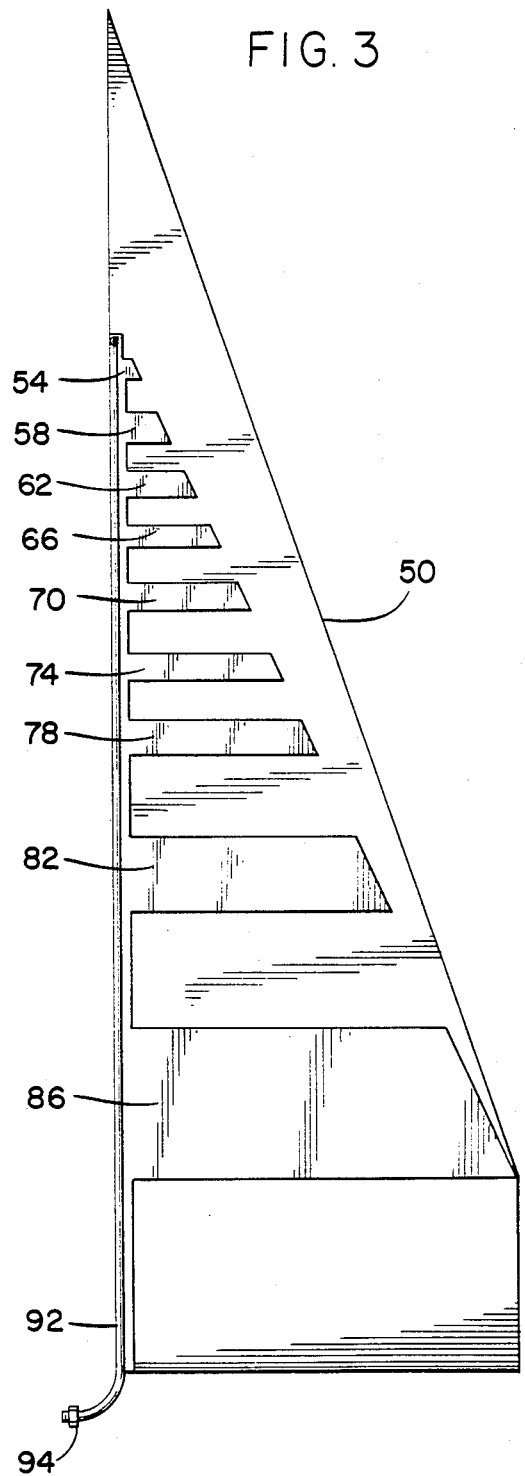

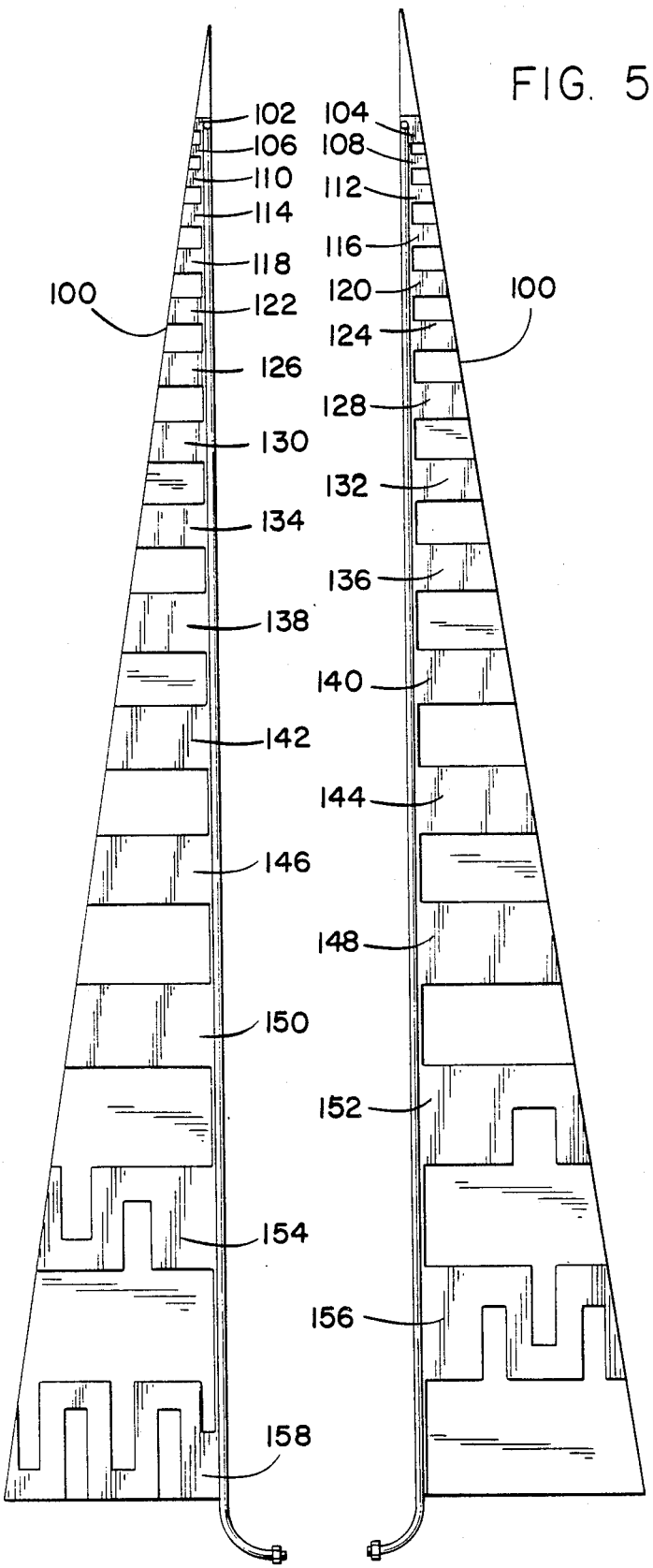

DIRECTION FINDING ANTENNA

FIELD OF THE INVENTION

This invention relates generally to electromagnetic antennas and is particularly concerned with direction finding antennas for use with aerospace missiles.

BACKGROUND OF THE INVENTION

Direction finding systems using antennas or arrays of antennas have been used in the past on self-propelled aerospace missiles in order to provide steering information to the missiles. The direction finding systems are a form of active or passive radar in which the antennas are used to transmit and receive or receive only, respectively, pulsed electromagnetic signals from the target. The radar technique used may include amplitude or phase monopulse systems. Missiles have been built which have antenna arrays or miniature scanning antennas mounted in the nose of the missile. Such designs are disadvantageous in that precious space inside the missile is consumed by bulky antennas.

The construction and operation of logarithmically periodic antennas is discussed in a two-part series of articles entitled "Log Periodic Antennas", written by Al Brogdon, and which were published on pages 81–85 of the October, 1967 issue of *CQ Magazine* and on pages 80–85 of the November, 1967 issue of that magazine, the disclosures of which are incorporated herein by reference.

The theory of frequency-independent log-periodic antennas is discussed on pages 18–48 and 18–49 of a chapter entitled "Antennas and Wave Propagation" by W. F. Croswell in *Electronics Engineers' Handbook*, Donald G. Fink (ed.), (McGraw Hill: 1975). Prior art tracking radar techniques are shown on pages 25–53 through 25–58 in a chapter entitled "Radar, Navigation, and Underwater Sound Systems" by David K. Barton in that same handbook. The two handbook disclosures are incorporated herein by reference.

A variety of wide bandwidth, logarithmically periodic antennas have been used in the past for radio wave reception by amateur ratio operators and others. Logarithmically periodic dipole antennas have been made which consist of a planar arrangement of parallel stubs arranged in equal-length pairs mounted on opposing sides of a boom with alternating feed connections between the stubs.

SUMMARY OF THE INVENTION

The direction finding antenna system of this invention has an array of antennas for mounting on the outside circumference of a generally cylindrical aerospace missile. Valuable space inside the missile is conserved through this invention, thus allowing the missile to be physically smaller (an advantage) or to contain additional items in the space which would be occupied by the direction finding antennas. The antennas of this invention have a flat, triangular shape which may be attached to or used as aerodynamic wings on the missile. Such a shape for the antennas is advantageous in that the streamlined shape of the missile is not disturbed by the antennas and the antennas may be securely attached to or become aerodynamically functional wings on the missile.

The antenna elements of this invention are constructed as spaced-apart thin metallic stub regions laminated to a dielectric, insulating support backing substrate. It is preferable that the antennas be fabricated using conventional double-sided printed circuit board etching techniques so that the size and geometry of each antenna element is precisely controlled. Such a construction allows precise control over the antenna shape and size which is important to assure improved electromagnetic performance.

The antenna stubs are spaced apart in a logarithmically increasing fashion and similarly have widths which increase logarithmically along the length of the antenna. The short, narrow stubs are positioned at the forward end of the antenna and primarily contribute to the high frequency performance of the antenna. The wide, tall stubs are positioned at the rearward end of the antenna and primarily contribute to the low frequency performance of the antenna. Undulating zig-zag convolutions may be used for low frequency stubs in order to increase the effective electrical length of the stubs and in order to improve the low frequency performance of the antenna. The convolutions allow an antenna having improved low frequency performance to fit within the maximum size limitations for wings imposed by the aerodynamic requirements of the missile.

The antenna element feedline may include a pair of conductors extending along the length of the antenna element, adjacent to the missile surface on opposite sides of the support backing, with each of the conductors connected to the antenna stubs. That is, one of the conductors connects to each of the stubs on one side of the backing, and the other conductor connects to each of the stubs on the other side of the backing. In one embodiment, one of the conductors is coaxial, having a center wire which is insulated from the stubs except at the forward end of the antenna, where it is connected to the other conductor. Such a feedline arrangement is compact and fits closely to the shape of an aerodynamic wing.

An alternative embodiment of the antenna of this invention includes a pair of coaxial conductors for passing signals to and receiving signals from the antenna. The pair of conductors is attached to the feed of the antenna so that the phase of the signals to the two connectors of the coaxial conductors are opposite. Such an arrangement of dual connectors would be used by the signal processing electronics attached to the antenna so that the phase of the antenna can be selected by using either one or the other of the two connectors. Such use of two connectors of opposite phase is very useful in the operation of the signal processing electronics by simplifying and making possible the measurement of sum and difference patterns for an array of wing antennas mounted on a missile body.

An alternative feedline design includes a meandering or undulating feed strip for mounting perpendicular to said stubs, and on the outer surface of said missile. The stubs are connected to the feed strip at locations where the feed strip passes under the backing support. The undulations of the feed strip have electrical lengths which increase logarithmically along the length of the antenna so that a proper phase delay is provided between the adjacent stubs.

The preferred embodiment has the antenna stubs arranged in a staggered sequence along the length of each side of the antenna element so that adjacent stubs are on opposite sides of the support backing. The feedline design insures that the adjacent stubs (which are on opposite sides of the substrate backing) have opposing electromagnetic phase thus improving the directional and gain performance of the antenna.

The antennas are mounted in an array which usually includes four antennas spaced around the circumference of the missile. A signal processing circuit using standard hybrids is used to connect the antenna elements to the radio transmitter/receiver. Arrays of antennas may be combined so that differing types of antenna elements may be used together; such as smaller, nose mounted antennas for the higher frequencies and larger, tail mounted antennas for the lower frequencies. The shape and construction of the antenna elements of this invention produces a high degree of directionality in an antenna array, which is an advantage in direction finding systems. The arrays constructed using the antennas of this invention also exhibit a high level of electromagnetic sensitivity which is advantageous in direction finding systems.

The wing antennas of this invention may be used in various applications such as unmanned vehicle systems, rockets, drones, various aerodynamic platforms, and land-based vehicles.

DESCRIPTION OF THE DRAWINGS

FIG. 2 is a left side view of a missile wing antenna wherein the antenna stubs are shown shaded for contrast.

FIG. 3 is a right side view of the missile wing antenna of FIG. 2 and wherein the antenna stubs are shown shaded for contrast.

FIG. 4 is a left side view of an alternative embodiment missile wing antenna including stubs having undulations and wherein the antenna stubs are shaded for contrast.

FIG. 5 is a right side view of the missile wing antenna of FIG. 4 wherein the antenna stubs are shown shaded for contrast.

DESCRIPTION OF THE PREFERRED EMBODIMENT OF THE INVENTION

Figure 1:
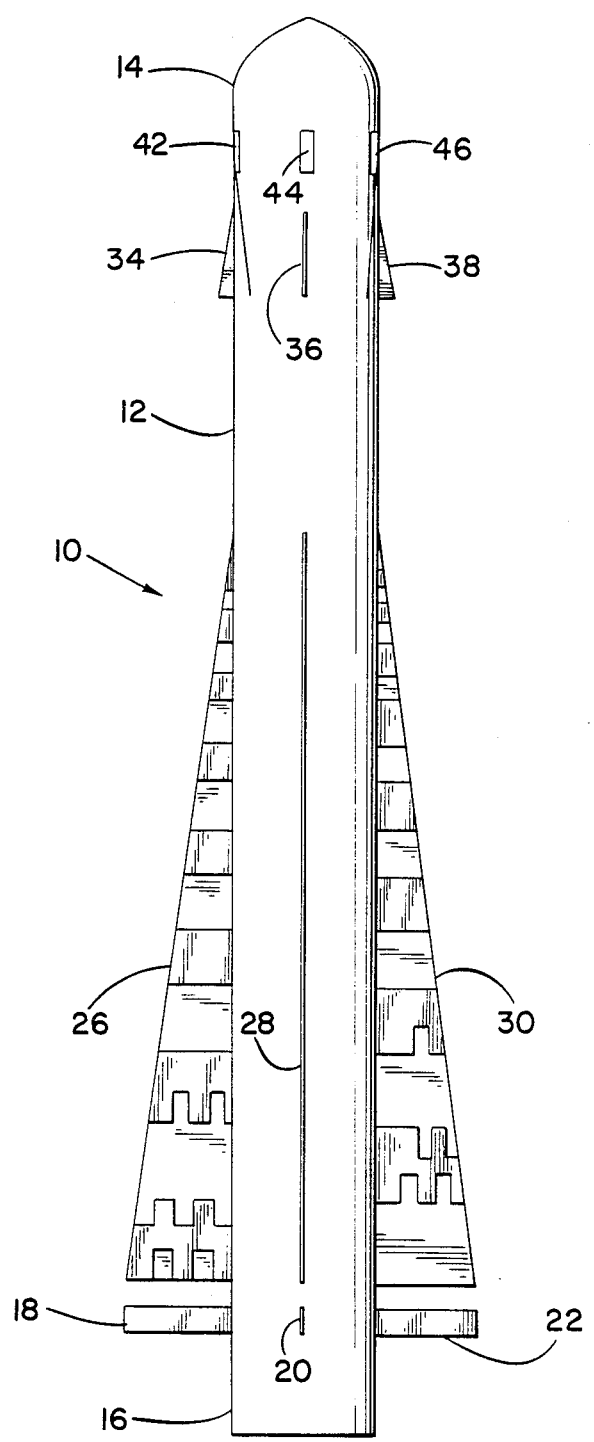
FIG. 1 is a side view of a missile having three direction finding antenna arrays mounted thereon.

Referring first to FIG. 1, the missile 10 is the usual type of self propelled aerospace missile which may be dropped from an airplane or otherwise launched and which is designed to use direction finding radar to track a target or otherwise steer itself. The body 12 of the missile 10 is an elongated, circular metallic cylinder which houses the missile rocket motor and electronics used in guiding the missile. The body 12 has a nose or forward end 14 which, when the missile 10 is in flight, is kept pointed towards the target. The missile body 12 has a rearward end or tail 16 which encloses the missile rocket motor that propels the missile 10 in flight.

When the missile 10 is in flight, it is kept on course towards a target by a direction finding radar system which senses the direction to the target by measuring the radio waves from the target. The direction finding system is connected to control the steering fins 18, 20, 22 and 24 (fin 24 is not shown) which serve to steer the missile 10 so that the direction of flight of the missile 10 is controlled.

Wing antennas 26, 28, 30 and 32 are (wing 32 is not shown) the four wing antennas which are mounted just forward of the fins 18, 20, 22, and 24, respectively, on the missile body 12 and serve to aerodynamically stabilize the missile 10 in flight, and also serve as antennas for the direction finding radar system of the missile 10. The wings 26, 28, 30 and 32 generally have the shape of a right triangle with the base of each triangularly shaped wing securely attached to the missile body 12 and the hypotenuse of each triangle sloping forwards towards the nose 14. Each of the wings 26, 28, 30 and 32 is relatively thin compared to its length and height and is of streamline shape to readily pass through the air during the flight of the missile 10. Each of the wing antennas 26, 28, 30, and 32 is provided with a plurality of antenna stub element regions on the surface thereof so that each of the wing antennas forms a log periodic monopole antenna. A plurality of forward wing antennas 34, 36, 38, and 40 (wing 40 is not shown) may be mounted forward (towards nose 14) of the wings 26, 28, 30, 32, respectively. The wings 34, 36, 38, and 40 are similar in construction to the wings 26, 28, 30 and 32, but are of smaller size. Tapered depth slot antennas 42, 44, 46, and 48 (antenna 48 is not shown in FIG. 1) may be mounted forward of the wings 34, 36, 38, and 40 for extended high frequency coverage.

The rearward wing antennas 26, 28, 30, and 32 are parts of an antenna array connected to the direction finding radar system in order to provide response in a frequency sub-band of 100 megahertz to 2000 megahertz. The forward wing antennas 34, 36, 38, and 40 are elements in an antenna array connected to the direction finding radar system of missile 10 in order to provide response in a frequency sub-band of 2000 megahertz to 8000 megahertz. The tapered depth slot antennas 42, 44, 46, and 48 are elements in an antenna array connected to the direction finding radar system of missile 10 in order to provide response in the frequency sub-band from 8000 megahertz to 18 gigahertz.

Referring next to FIGS. 2 and 3, opposite (left and right) sides of the same rearward wing antenna are shown in which the stub element regions thereof are shown shaded. The stub element regions have a height and width which determines their individual resonant frequencies or optimum response frequencies. The wing antenna 50 is shaped approximately like a right triangle and shows one of the prototypes made during the testing of this invention. The wing antenna 50 has a length of approximately 83 centimeters and a height of approximately 21.5 centimeters and a thickness of approximately 0.2 centimeters. The wing antenna 50 is a prototype which was manufactured from standard, commercially available printed circuit board material having a thin layer of electrically conductive copper foil applied to both surfaces, and which was etched by ferric chloride to form the pattern shown in FIGS. 2 and 3 wherein the shaded portions of FIGS. 2 and 3 indicate the copper foil which was left after the ferric chloride etching process. The wing antenna 50 is a prototype which was not intended for use as an actual aerospace wing for mounting on the missile 10, but which was built in order to test the performance of the configuration of the antenna. It is anticipated that the same type of construction shown in FIGS. 2 and 3 may be applied to the outward surfaces of conventional aerodynamic missile wings, or otherwise incorporated into conventional aerodynamic missile wings. For example, the sides shown in FIGS. 2 and 3 may be separately fabricated and applied to opposing surfaces of a missile wing, so that the missile wing is sandwiched between the stubs of the two antenna sides. An alternative approach would be to use the antenna itself as the core of a built-up wing in which insulating structural reinforcing materials may be attached to both sides of the antenna itself to form an aerodynamic wing.

As shown in FIGS. 2 and 3, the etched copper foil pattern on each side of the wing antenna 50 includes a plurality of antenna stubs arranged in a spaced apart sequence wherein the spaces between adjacent stubs decrease in a logarithmically periodic fashion along the length of the wing antenna 50. The width of each of the stubs is also arranged in a periodic, logarithmically decreasing sequence (from back to front of wing 50) so that as the separation between adjacent stubs decrease, the width of the stubs also decreases. The width of each of the stubs shown in FIGS. 2 and 3 is given in the following table in centimeters:

| Stub No. | Width |
|---|---|
| 52 | 2.0 centimeters |
| 54 | 3.2 |
| 56 | 1.2 |
| 58 | 1.3 |
| 60 | 1.6 |
| 62 | 1.7 |
| 64 | 1.9 |
| 66 | 2.2 |
| 68 | 2.6 |
| 70 | 2.8 |
| 72 | 3.1 |
| 74 | 3.6 |
| 76 | 4.0 |
| 78 | 4.5 |
| 80 | 5.1 |
| 82 | 5.6 |
| 84 | 6.5 |
| 86 | 7.0 |
| 88 | 7.6 |

The stub 88 has a flat top which gives it a constant height of 21.5 centimeters. The stubs 52–86 are bounded above by a sloping hypotenuse line which slopes downward from the height of 21.5 centimeters to intersect with the base of the triangular wing 50 in a distance of 61 centimeters. All of the measurements given in this description are approximate and are presented for the purposes of illustration of possible embodiments of this invention. As can be seen from FIG. 2, adjacent stub elements (such as 84, 86, and 88) do not overlap; that is, the space between stubs 84 and 88 is as large as the width of the stub 86 and the stub 86 is positioned between the stubs 84 and 88, but on the opposite side of the wing antenna 50.

Referring next to FIGS. 4 and 5, an alternative embodiment for the wing antenna shown in FIGS. 2 and 3 is presented. FIGS. 4 and 5 show opposite sides of the same wing antenna 100. The wing antenna 100 is approximately 129.5 centimeters in length and 20 centimeters in height. The width of each of the stub elements of the wing antenna 100 is given in the following table:

| Stub No. | Width | |
|---|---|---|
| 102 | 1.0 | centimeters |
| 104 | 2.1 | |
| 106 | 1.2 | |
| 108 | 1.4 | |
| 110 | 1.4 | |
| 112 | 1.6 | |
| 114 | 1.7 | |
| 116 | 1.9 | |
| 118 | 2.1 | |
| 120 | 2.2 | |
| 122 | 2.3 | |
| 124 | 2.5 | |
| 126 | 2.9 | |
| 128 | 3.1 | |
| 130 | 3.4 | |
| 132 | 3.6 | |
| 134 | 3.9 | |
| 136 | 4.2 | |
| 138 | 5.1 | |
| 140 | 4.9 | |
| 142 | 5.5 | |
| 144 | 6.2 | |
| 146 | 6.1 | |
| 148 | 7.2 | |
| 150 | 7.3 | |
| 152 | 8.6 | |
| 154 | 9.1 | |
| 156 | 10.0 | |
| 158 | 10.1 | |

The wing antenna 100 shown in FIGS. 4 and 5 is very similar in construction to the wing antenna 50 of FIGS. 2 and 3, and a major difference is the type of stub construction particularly shown by the stubs 152, 154, 156, and 158 of FIGS. 4 and 5. The stubs 152, 154, 156, and 158 use an undulating (zig-zag) back and forth folded pattern which effectively increases the electrical length of the stubs 152, 154, 156 and 158. The effect of using such undulations or convolutions in the stubs 152, 154, 156 and 158 is to shift the optimum performance frequency for those stubs to lower frequencies than would otherwise be the case without such undulations. That is, for example, if the stub 158 were to have a simple, 4-sided shape, extending from the base to the hypotenuse of the wing 100, the stub 158 would have a higher optimal frequency of operation than with the undulations shown in FIG. 4. The purpose of providing such undulations in the stubs of the wing antenna 100 is to improve the low frequency performance of the wing antenna 100 without requiring an increase in the physical size of the wing antenna 100. An important limitation on the physical size of the wing antenna 100 is the aerodynamic requirements imposed by the size and shape of the missile 10.

Figure 6:
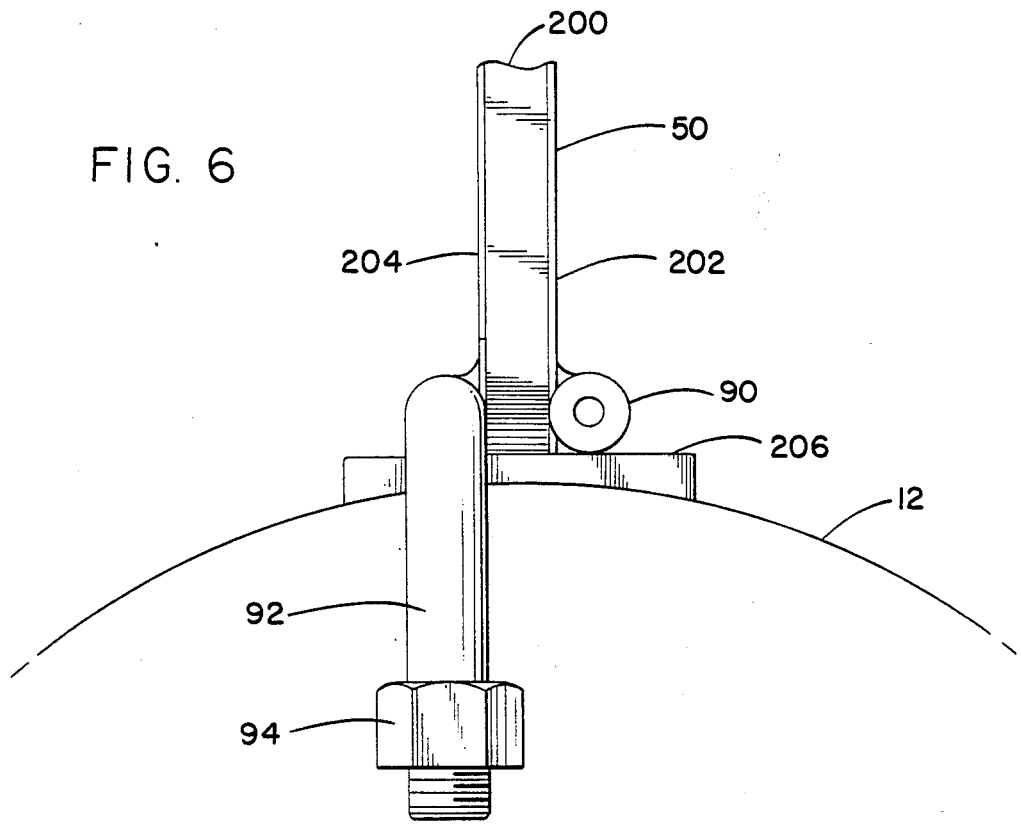
FIG. 6 is a partially cut away rear elevational view of the wing antenna of FIGS. 2 and 3 mounted on the missile body of FIG. 1.

Referring next to FIG. 6, the wing antenna 50 includes a triangular dielectric backing substrate 200 which is preferably 0.090 inch thick fiberglass printed circuit board material. The substrate 200 has layers of copper foil 202 and 204 on opposite surfaces thereof. The copper foil 202 has the stub region pattern shown in FIG. 2, and the copper foil 204 has the stub region pattern shown in FIG. 3.

Figure 7:
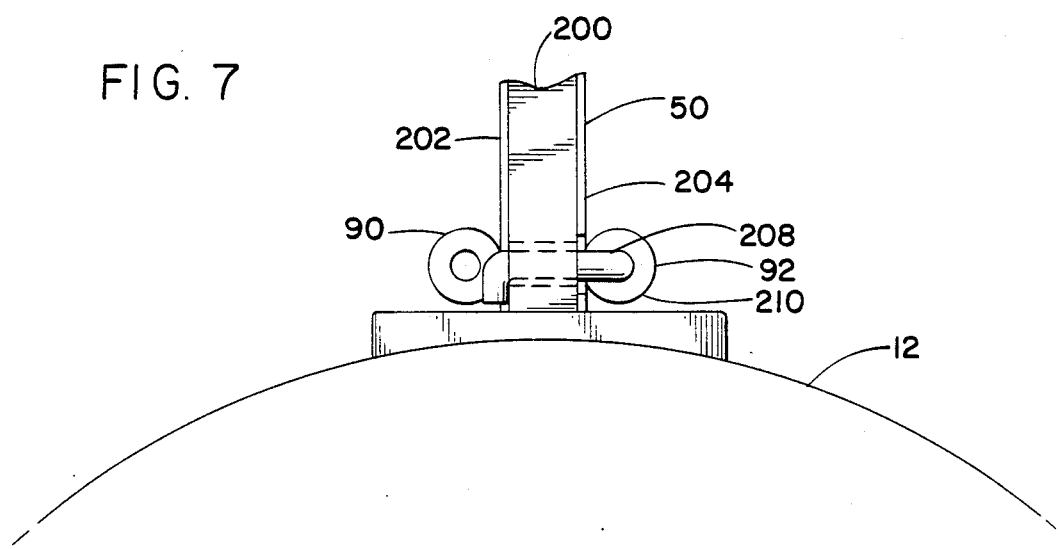
FIG. 7 is a partially cut away front elevational view of the wing antenna of FIGS. 2 and 3 mounted on the missile body of FIG. 1.

The structures shown in FIGS. 6 and 7 may be used with the wing antenna designs shown in FIGS. 2 and 3 or FIGS. 4 and 5. The feed structures shown in FIGS. 6 and 7 perform the same function for the respective parts of the two versions of the wing antenna (with one version shown in FIGS. 2 and 3 and another version shown in FIGS. 4 and 5).

The prototype shown in FIGS. 6 and 7 is constructed using commercially available printed circuit board material which is provided with a substrate 200 and the layers 202 and 204. The substrate 200 is securely attached to a dielectric supporting pad 206 which is preferably composed of fiberglass printed circuit board material. The purpose of the support pad 206 is to provide isolation between the wing antenna 50 and the missile body 12 and also to provide firm mechanical connection between the wing antenna 50 and the missile body 12. As shown, the coaxial outer conductors of the coaxial cables 90 and 92 are electrically connected to the foil layers 202 and 204, respectively, and extend along the channels formed by the intersection of substrate 200 with the supporting member 206. As shown in FIG. 6 (the rearward end of wing antenna 50), the coaxial cable 92 is provided with a cable connector 94 for connection to the direction finding circuitry and hybrids mounted inside the missile body 12. As shown in FIG. 7, the center conductor 208 of the coaxial cable 92 extends through the dielectric insulating substrate 200 at the forward end of the wing antenna 50 and makes contact with the foil layer 202 at the forward end of the wing antenna 50. The foil layer 204 is etched away at the forward end of the wing antenna 50 so that the center conductor 208 of the coaxial cable 92 does not make contact with the foil layer 204 at the forward end of the wing antenna 50.

The coaxial cables 90 and 92 shown in FIG. 6 form a feedline structure for the wing antenna 50 which causes the stubs of foil layer 204 to be of opposite electrical polarity or out of phase with the stubs of foil layer 202. This difference in phase is produced by connecting the coaxial outer conductor of cable 92 to the foil layer 204, and by connecting the center conductor 208 of the coaxial cable 92 to the foil layer 202. The feedline structure forms a broadband balun for matching the coaxial line (at connector 94) to the parallel stubs. The center conductor of coaxial cable 92 is labeled 208. The feedline structure of FIGS. 6 and 7 performs an important function in causing the electrical polarity of the stubs of layer 202 to be opposite from the polarity of the stubs of layer 204. The difference in polarity is important in causing the wing antenna 50 to function as a log-periodic monopole antenna. Referring back to FIGS. 2 and 3, the connections of coaxial lines 90 and 92 shown in FIGS. 6 and 7 serves to ensure that the electrical polarity of stubs 54, 58, 62, 66, 70, 74, 78, 82 and 86 are opposite to the polarity of stubs 52, 56, 60, 64, 68, 72, 76, 80, 84, and 88. For example, this ensures that the polarity of stub 82 (which is physically adjacent to stub 80) is of opposite electrical polarity to that of stub 80. Such an out-of-phase relationship is important in improving the effectiveness of the wing antenna 50 by increasing the efficiency of the wing antenna 50 in both receiving and transmitting energy, and by improving the directional characteristics (increasing the front to back ratio) of the wing antenna 50 so that electromagnetic energy is preferentially radiated towards and received from the forward end of the wing antenna 50.

In the prototype constructed, the coaxial cables 90 and 92 consisted of flexible, commercially available coaxial wiring cable mounted inside malleable, semirigid copper tubing which was soldered to the foil layers 202 and 204, respectively. The braided outer shield of the wiring cable is electrically connected to the respective copper tubing for each of the cables 90 and 92.

The use of a wing insulating dielectric layer 200 allows the adjacent antenna stubs to be very close together, and yet to be of opposite polarity. The staggered arrangement of antenna stubs provided by placing adjacent stubs on opposite sides of the dielectric substrate 200 allows for a compact construction which is compatible with the physical demands of aerodynamic missile wings; i.e., the aerodynamic antenna carrying wing may be of small thickness and generally have an elongated, right triangular shape.

Figure 6A:
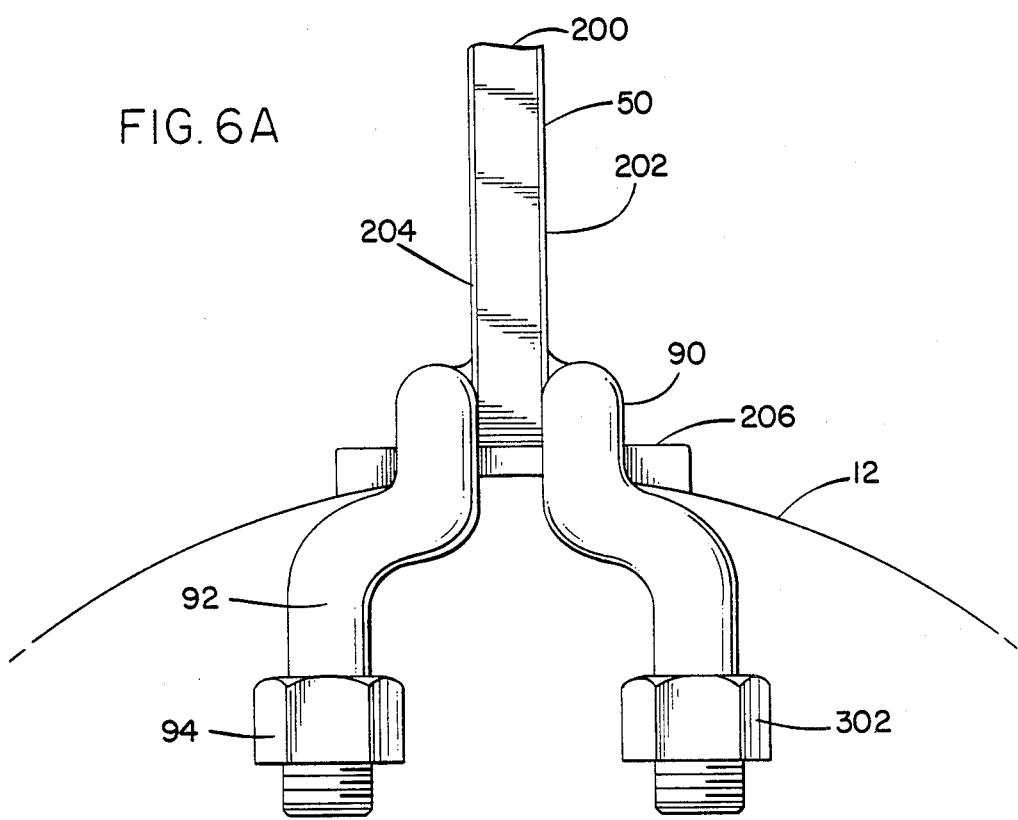
FIG. 6A is an alternative embodiment of the antenna feed structure shown in FIG. 6.
Figure 7A:
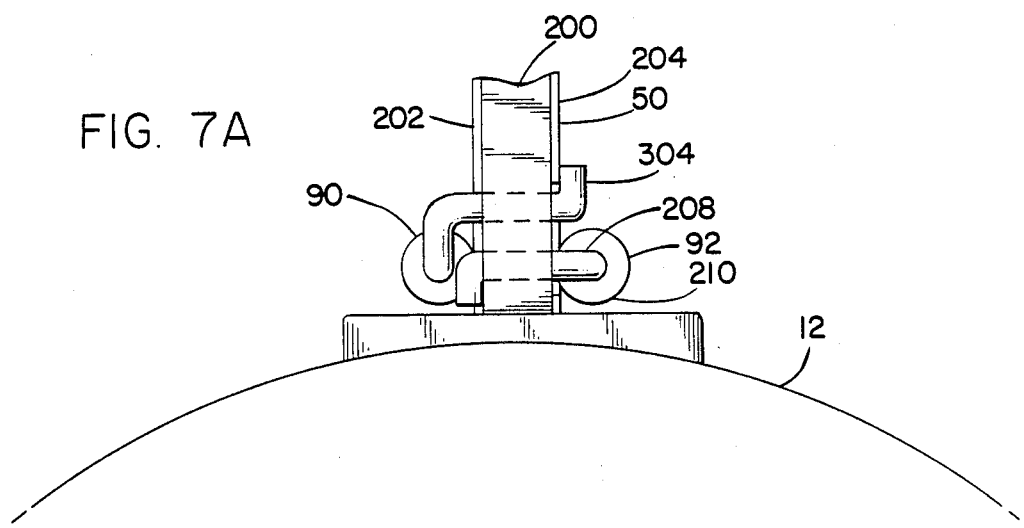
FIG. 7A is an alternative embodiment of the antenna feed structure shown in FIG. 7.

Referring next to FIGS. 6A and 7A, feed structures similar to those shown in FIGS. 6 and 7 are used in an alternative embodiment which provides a pair of connectors 94 and 302 which are of opposite phase. The opposite electrical phase presented by connectors 300 and 302 is a result of the arrangement of the feed structures shown in FIGS. 6A and 7A and is useful in the signal processing electronics (not shown) in measuring the sum and difference patterns for arrays of antennas as shown in FIG. 1.

The coaxial cables 90 and 92 shown in FIGS. 6A and 7A are similar to those shown in FIGS. 6 and 7, excepting that (as shown in FIG. 6A), the cable 90 is equipped with a connector 302, and (as shown in FIG. 7A) the center conductor 304 of cable 90 extends through the substrate 200 and contacts the foil layer 204. Thus, the arrangement and construction of the antenna feed structure formed by coaxial cables 90 and 92 is symmetric about the substrate 200.

In practice, the selection is made in connecting to either connector 94 or 302 in order to select the phasing of the antenna. The phasing of the antenna is of particular importance when more than one antenna are used in an array, so that the relative phase relationship between the antennas in the array determines the radiating properties of the array, and also determines the nature of the sum and difference signals between antennas in the array. It may be possible to provide electrical switching between connectors 94 and 302 so that the signal processing electronics (not shown) may automatically select the appropriate phasing of the antenna.

Figure 8:
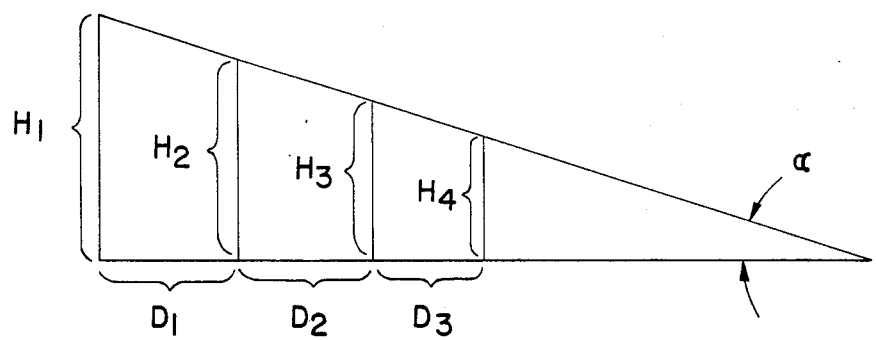
FIG. 8 is a diagram showing the angular and dimensional relationships for use with the log periodic monopole antenna of this invention.

Referring next to FIG. 8, the following formulas may be used in constructing the antennas of this invention:
$\alpha$ = angle of slope of the antenna
$\tau$ = ratio of heights or widths of adjacent stubs
$\sigma$ = ratio between the distance to the next adjacent shorter stub and four times the height of the stub
H = height of a stub
D = distance between adjacent stubs $$\sigma = \frac{(1 - \tau)}{4} \cot \alpha$$

$$\frac{D_1}{4H_1} = \frac{D_2}{4H_2} = \frac{D_3}{4H_3} = \sigma$$

For preferred performance:

$$0.80 \leq \tau \leq 0.95$$

$$20° \leq \alpha \leq 30°$$

The diagram of FIG. 8 shows a representation of the general type of log periodic monopole antenna layout shown in FIGS. 2, 3, 4, and 5. The formulas shown above may be used to determine the preferred width of stubs to use, and the preferred separation between stubs. The formulas above also detail the preferred ranges for the variables ($\tau$ and $\alpha$) used in the construction of the wing antenna.

The number of stubs which should be included is limited by the desired high frequency performance and the physical size limitations at the forward end of the wing antenna. As shown in FIGS. 4 and 5, convolutions may be added to the longer stubs in order to lower their optimal performance frequency so that the wing antenna has improved low frequency performance.

Figure 9:
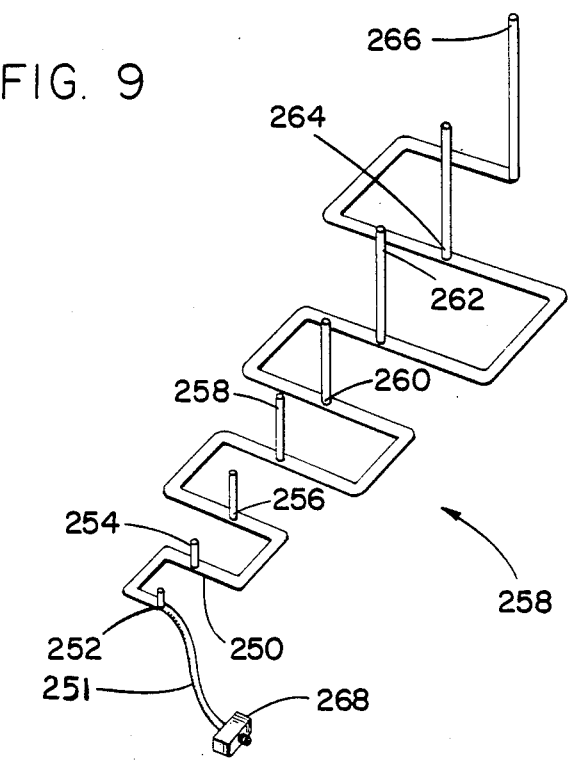
FIG. 9 is a front perspective view of an alternative embodiment log periodic monopole antenna using a meandering feedline.

Referring next to FIG. 9, an antenna 258 having an alternative construction for the feedline arrangement shown in FIGS. 6 and 7 is presented. In FIG. 9, a meander feedstrip 250 interconnects antenna stubs 252, 254, 256, 258, 260, 262, 264 and 266. The stubs 252–266 are arranged in a straight line by sequentially increasing height, with the height of each stub and the distance between stubs determined in accordance with the formulas presented above in connection with FIG. 8. Although not shown in the figure, the diameter of each stub may similarly be increased along the length of the antenna in order to improve performance. A sufficient length of meander feedstrip 250 is placed between adjacent stubs so that the electrical phase delay between adjacent stubs is preferably 200° to 225° (the length of which depends on the resonant frequencies of the stubs). The feedstrip 250 contacts the lower portion of each of the antenna stubs 252–266 and undulates in a back and forth pattern with the undulations (the length of each of which is determined by the desired electrical phase shift) increasing in size in moving from the front to the rear of the antenna 258. The undulations increase in size along the length of the antenna 258 because the optimal response frequencies of the stubs at the rear of antenna 258 is lower than for those at the front of antenna 258. The feedline 250 is terminated at the front of the antenna 258 in a connector 256 for connection to the direction finding electronics inside the missile 10. The stubs 252–266 may be circular cylinders of uniform diameter which may be incorporated into an aerodynamic wing and mounted on a missile 10 (similarly to the mounting of wings 26, 28 and 30 in FIG. 1). In practice, the feedstrip 250 is mounted over a dielectric insulator (not shown) on the periphery of the missile body 12, which acts as a ground plane.

The connector 268 is a coaxial connector in which the center conductor of the connector 268 makes electrical contact with the feedline 250, and in which the coaxial outer conductor of the connector 268 is electrically connected to the ground plane (i.e., the periphery of the missile body 12). A portion of coaxial cable 251 extends between the connector 268 and the feedstrip 250 so that the coaxial outer conductor of the cable 251 makes contact with the periphery of the missile body 12, and so that the center conductor of the cable 251 contacts the feedstrip 250.

Figure 10:
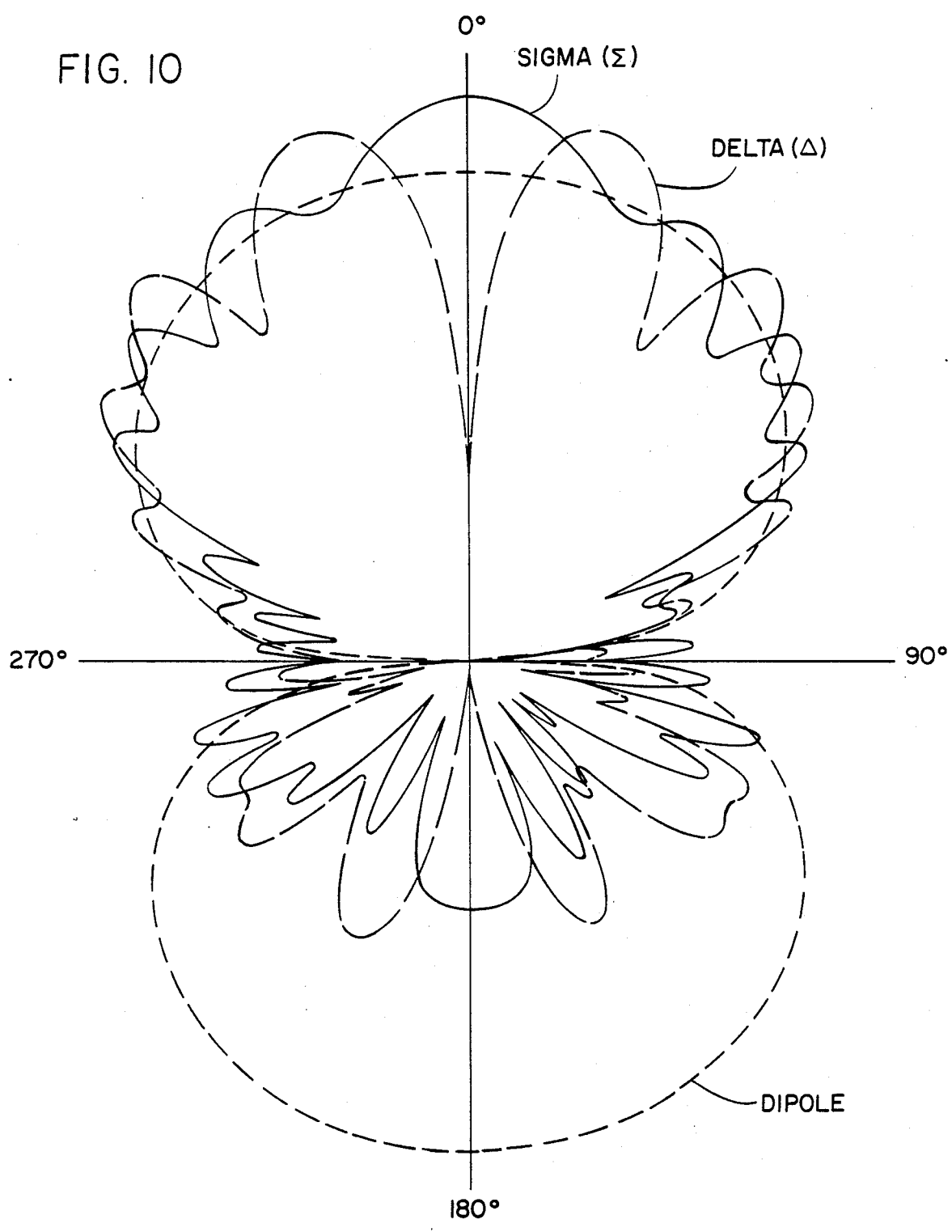
FIG. 10 is a polar coordinate diagram on a logarithmic scale of the propagation characteristics expected when an array of wing antennas like those shown in FIGS. 2 and 3 is used on the missile body of FIG. 1.

Referring next to FIG. 10, a polar coordinate graph is shown of relative (on a logarithmic scale) radiated electromagnetic power at a frequency of 1000 megahertz in the azimuth plane for the type of antenna shown in FIGS. 2 and 3; wherein four such antennas were mounted about a mock-up of the missile body 12 as shown in FIG. 1. A mock-up of the missile 10 was placed at the position indicated by the intersection of the axes in FIG. 10, and was pointed towards the point marked 0°. The line represented by short dashes and labeled "DIPOLE" corresponds to the reference radiation pattern of a standard dipole antenna. The line represented by a solid line and labeled "SIGMA ($\Sigma$)" corresponds to the summation of antennas on both sides of the missile body 12. The line represented by long dashes and labeled "DELTA ($\Delta$)" corresponds to the difference between antennas on opposite sides of the missile body 12. This type of sum and difference information may be used by a digital computer (not shown) of the direction finding electronics inside missile 10 in order to properly guide the missile 10. FIG. 10 illustrates the high efficiency and directional sensitivity of the antennas of this invention. The large response shown in the forward half plane (270° to 0° to 90°) versus the small response shown in the backward half plane (90° to 270°) shows the large front-to-back ratio of the antenna of this invention.

What is claimed:

1. A direction finding antenna system for use on an aerospace vehicle, said antenna system comprising:
   a plurality of log periodic monopole antennas, wherein each of said antennas includes a plurality of antenna stubs arranged in a substantially log periodic sequence, wherein said stubs are mounted on an aerodynamic wing on the outside of said vehicle in order to conserve space inside said missile, and wherein at least one of said stubs undulates so as to produce lower resonant frequencies for said stubs; and
   a feedline for each of said antennas and connected to said stubs so that adjacent ones of said stubs are electrically out of phase, so that performance of said plurality of said antennas is preferentially enhanced in a forward direction towards the nose of said vehicle thus improving the ability of said missile to track a target.

2. The antenna system of claim 1 wherein each of said antennas comprises a dielectric, insulative substrate having metallic foil layers on both sides thereof, wherein said foil layers form said antenna stubs so that adjacent antenna stubs are on opposite sides of said substrate.

3. The antenna system of claim 2 wherein the width of each of said stubs varies in a log periodic fashion.

4. The antenna system of claim 2 or 3 wherein said feedline for each one of said antennas comprises a coaxial cable extending from the rear of said antenna so that the coaxial outer conductor makes electrical contact with each of said stubs on one side of said substrate and so that the center conductor of said cable makes electrical contact with each of said stubs on the opposite side of said substrate.

5. The antenna system of claim 1 wherein said feedline for each one of said antennas comprises a meandering conductive strip extending from the front of said antenna and making electrical contact with each of said stubs, with the length of said strip between adjacent of said stubs being sufficient to cause said adjacent stubs to be of opposite electrical polarity.

6. An antenna for use with radio frequency electromagnetic radiation, said antenna comprising:
   a plurality of means for resonating in response to electromagnetic radiation, wherein each of said means resonates at differing radiation frequencies and wherein at least one of said resonating means has undulations which provide lower resonant frequencies for said stubs;

means for supporting said means for resonating in a side by side relationship, so that said means for resonating are arranged in a substantially log periodic sequence;

means for coupling electromagnetic frequencies to said antenna by making electrical contact to each of said means for resonating so that adjacent of said means for resonating are of opposite electrical polarity, and so that said means for resonating are connected as monopoles.

7. The antenna of claim 6 wherein said means for mounting secures said means for resonating to an aerodynamic wing on the outside of an aerospace vehicle.

8. The antenna of claims 6 or 7 wherein said means for supporting comprises a dielectric substrate and wherein said means for resonating comprise antenna stubs formed in metal foil on said substrate.

9. The antenna of claim 8 wherein said antenna stubs are formed on opposing sides of said dielectric substrate in a staggered relationship so that adjacent of the stubs are on opposite sides of said dielectric substrate.

10. The antenna of claim 9 wherein the width of each of said antenna stubs formed in metal foil is arranged in a substantially log periodic sequence.

11. The antenna of claim 10 wherein the width of each of said antenna stubs formed in metal foil is arranged so that adjacent of said stubs have boundaries which are directly opposite across said dielectric substrate.

12. The antenna of claim 9 wherein said means for coupling comprises a first coaxial cable extending along a first side of said dielectric substrate so that the coaxial outer conductor of said first cable makes electrical contact with the stubs of said first side, and so that the central conductor of said first cable makes electrical contact with the stubs on the second side of said substrate opposite said first side.

13. The antenna of claim 12 wherein said means for coupling further comprises a second coaxial cable extending along said second side of said dielectric substrate so that the coaxial outer conductor of said second cable makes electrical contact with the stubs of said second side, and so that the central conductor of said second cable makes electrical contact with the stubs on the first side of said substrate.

14. The antenna of claim 9 wherein said means for coupling provides a pair of oppositely phased connectors for coupling to signal processing circuitry.

15. The antenna of claim 6 wherein said means for coupling provides a pair of oppositely phased connectors for coupling to signal processing electronics.

16. The antenna of claims 6 or 7 wherein said means for resonating comprise antenna stubs and said means for coupling comprises a meandering conductive strip extending between and making contact with said antenna stubs, with the length of said strip between adjacent of said stubs being sufficient to cause said adjacent stubs to be of opposite electrical polarity.

17. The antenna of claim 16 wherein the length of each of said antenna stubs is arranged in a substantially log periodic sequence.

* * * * *

UNITED STATES PATENT AND TRADEMARK OFFICE
CERTIFICATE OF CORRECTION

PATENT NO. : 4,494,121

DATED : January 15, 1985

INVENTOR(S) : Walter et al.

It is certified that error appears in the above-identified patent and that said Letters Patent are hereby corrected as shown below:

Column 9, line 40, please correct "connector 256" to --connector 268-- .

Signed and Sealed this

Thirty-first Day of December 1985

[SEAL]

Attest:

Attesting Officer

DONALD J. QUIGG

Commissioner of Patents and Trademarks